(12) United States Patent
Dar et al.

(10) Patent No.: US 7,375,175 B2
(45) Date of Patent: May 20, 2008

(54) DISPERSIONS CONTAINING LIVING RADICALS

(75) Inventors: Yadunandan Dar, Somerset, NJ (US); Smita Shah, Edison, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 345 days.

(21) Appl. No.: 11/051,359

(22) Filed: Feb. 4, 2005

(65) Prior Publication Data

US 2005/0182164 A1    Aug. 18, 2005

Related U.S. Application Data

(60) Continuation-in-part of application No. 11/002,051, filed on Dec. 2, 2004, now abandoned, which is a division of application No. 10/632,764, filed on Aug. 1, 2003, now Pat. No. 6,841,636.

(60) Provisional application No. 60/404,557, filed on Aug. 19, 2002.

(51) Int. Cl.
*C08F 210/00*    (2006.01)

(52) U.S. Cl. .................... 526/348; 526/220; 526/219; 526/219.6; 526/227

(58) Field of Classification Search ............... 526/348, 526/220, 219, 200, 219.6, 227
See application file for complete search history.

(56) References Cited

U.S. PATENT DOCUMENTS

| | | | |
|---|---|---|---|
| 5,173,551 A * | 12/1992 | Caneba ..................... 526/208 |
| 5,455,315 A | 10/1995 | Paine et al. |
| 5,627,248 A | 5/1997 | Koster et al. |
| 5,677,388 A | 10/1997 | Koster et al. |
| 5,763,548 A | 6/1998 | Matyjaszewski et al. |
| 6,121,371 A * | 9/2000 | Matyjaszewski et al. ... 524/804 |
| 6,271,340 B1 | 8/2001 | Anderson et al. |
| 6,407,187 B1 | 6/2002 | Matyjaszewski et al. |
| 6,472,486 B2 | 10/2002 | Klaerner et al. |
| 2002/0065380 A1 | 5/2002 | Charmot et al. |
| 2003/0149195 A1 * | 8/2003 | Dar et al. ..................... 526/61 |

FOREIGN PATENT DOCUMENTS

| | | |
|---|---|---|
| DE | 198 58 103 | 6/2000 |
| WO | WO 98/30601 | 7/1998 |
| WO | WO 00/35962 | 6/2000 |
| WO | WO 02/28932 | 4/2002 |
| WO | WO 2004/002963 | 12/2002 |
| WO | WO 03/059960 | 7/2003 |
| WO | WO 03/059974 | 7/2003 |

OTHER PUBLICATIONS

Wang, B. et al.: Polymerization Control Through the Free Radical Retrograde-Precipitation Polymerization Process; Journal of Applied Polymer Science; John Wiley and Sons Inc. New York, US, vol. 71, No. 5, 1999; pp. 761-774.

\* cited by examiner

*Primary Examiner*—Ling-Sui Choi

(57) ABSTRACT

A dispersion of polymer particles, the particle containing, on average, one or more living radicals each, the radicals not being chemically protected. Further disclosed is a free radical polymerization process resulting in a dispersion containing polymer particles having on average one or more living radicals. The process involves carefully regulating the polymerization conditions to produce small size particles under monomer-starved conditions containing, on average, more than one living radical in every particle. These living polymer radicals can be further reacted to form polymers with a controlled architecture.

22 Claims, 10 Drawing Sheets

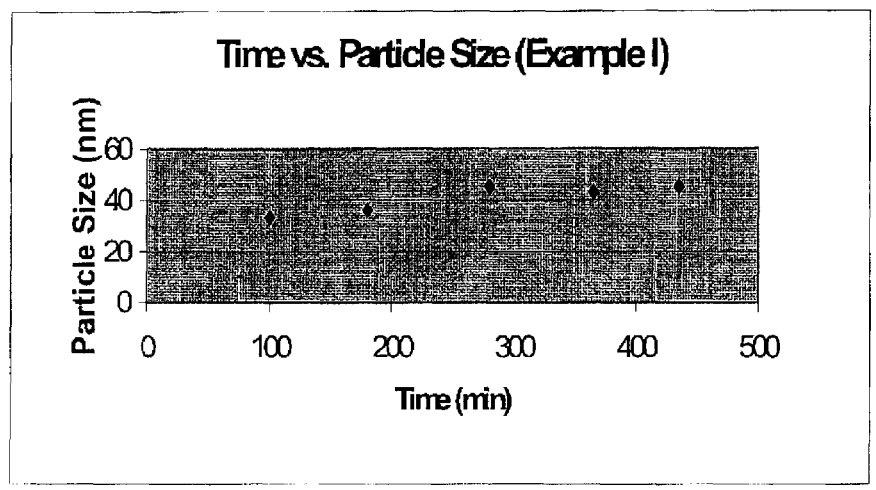
Figure 1. Particle size evolution for Example 1

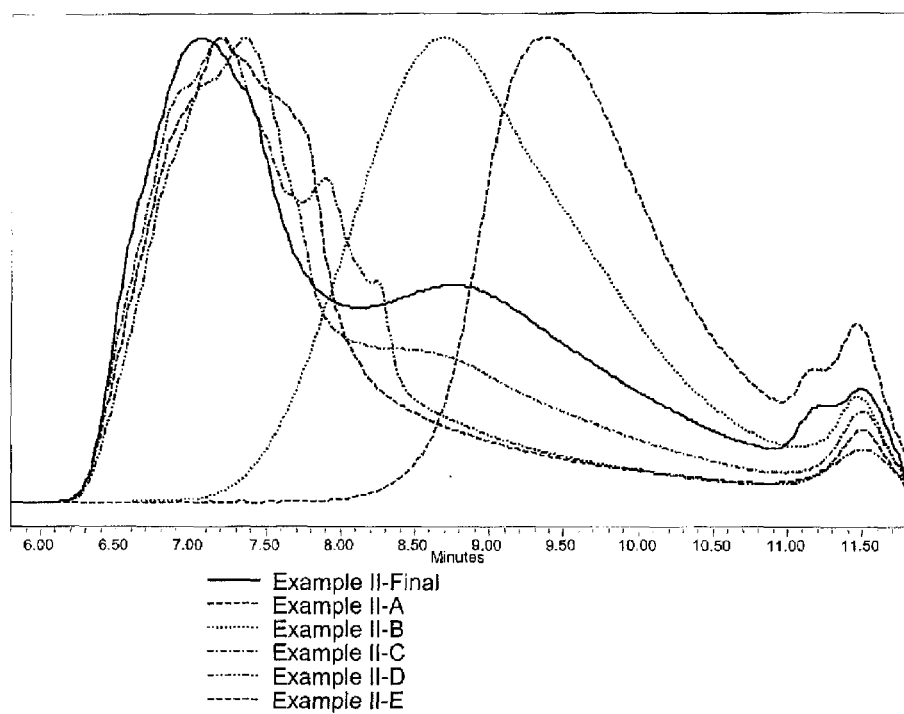
Figure 2. GPC curve for Example II

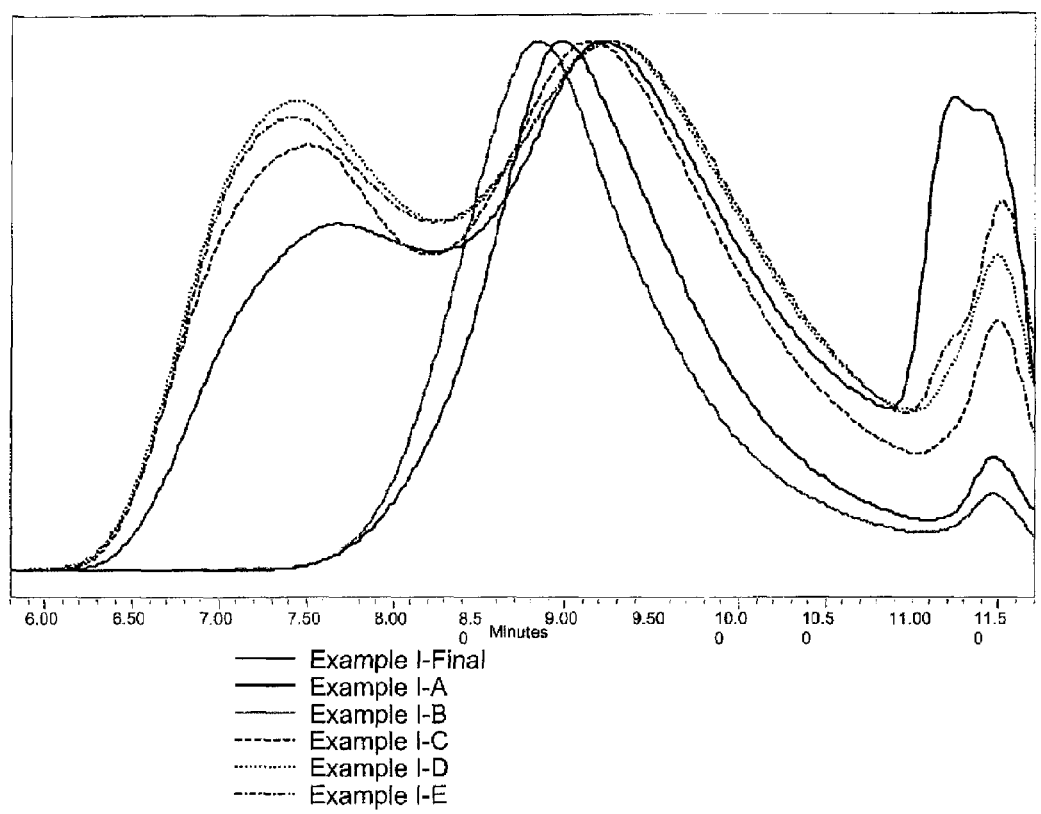
Figure 3. GPC curve for Example I

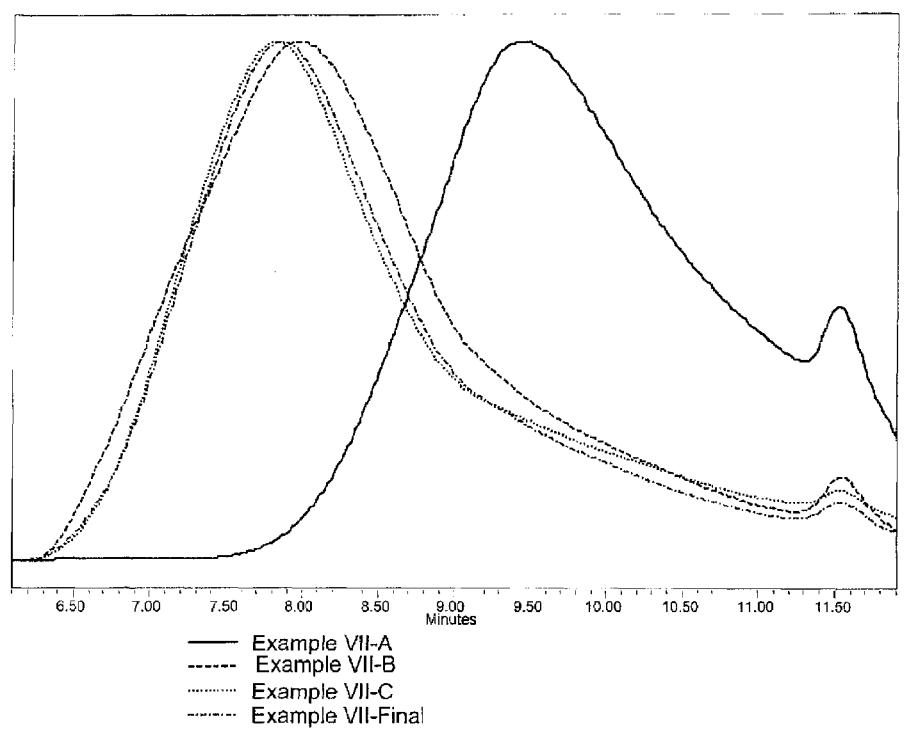
Figure 4. GPC curve for Example VII

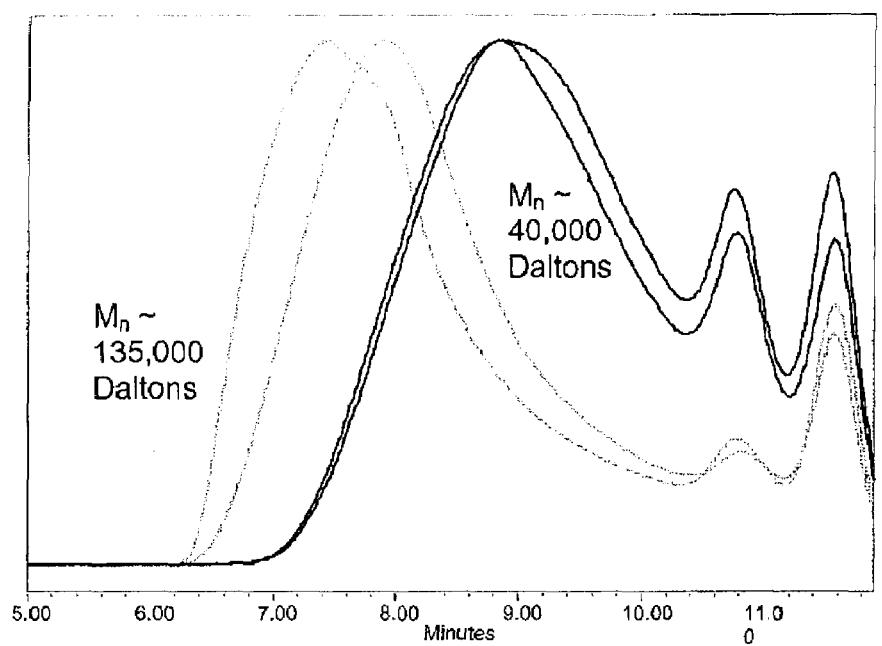
Figure 5. GPC curve for Example VIII

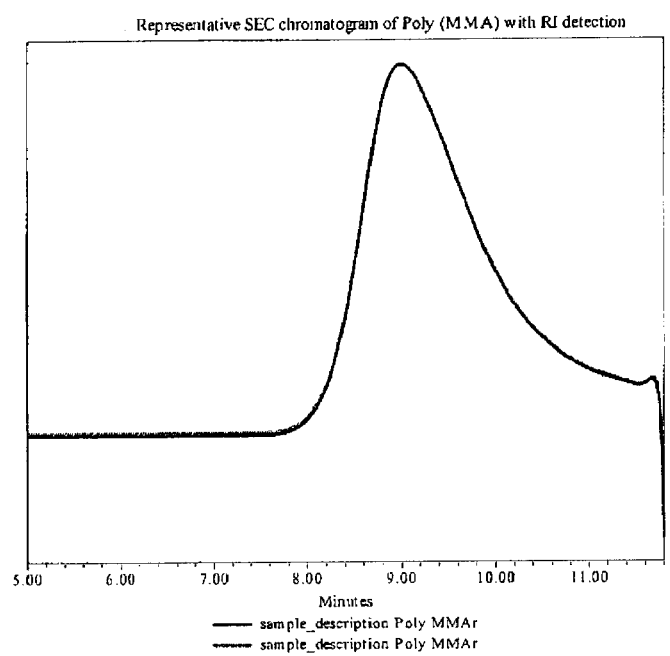
Figure 6. GPC curve for Example XIV

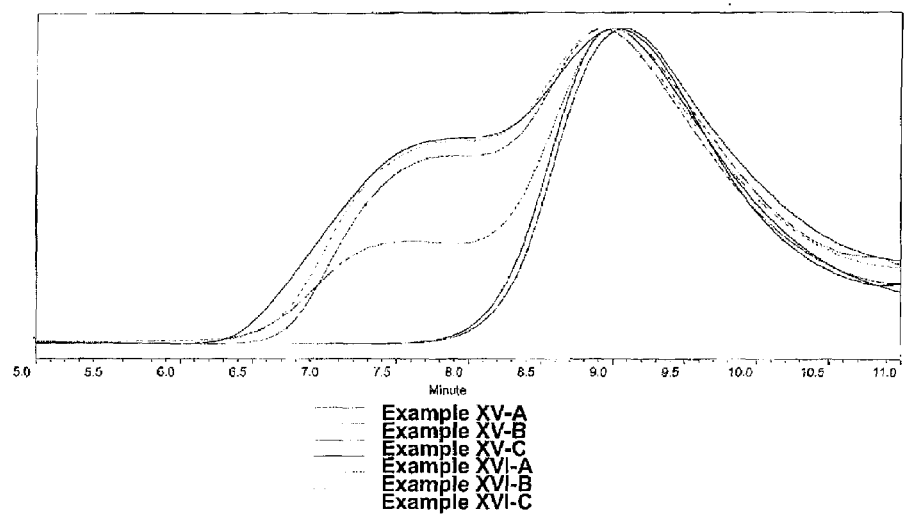
Figure 7. GPC curve for Examples XV and XVI
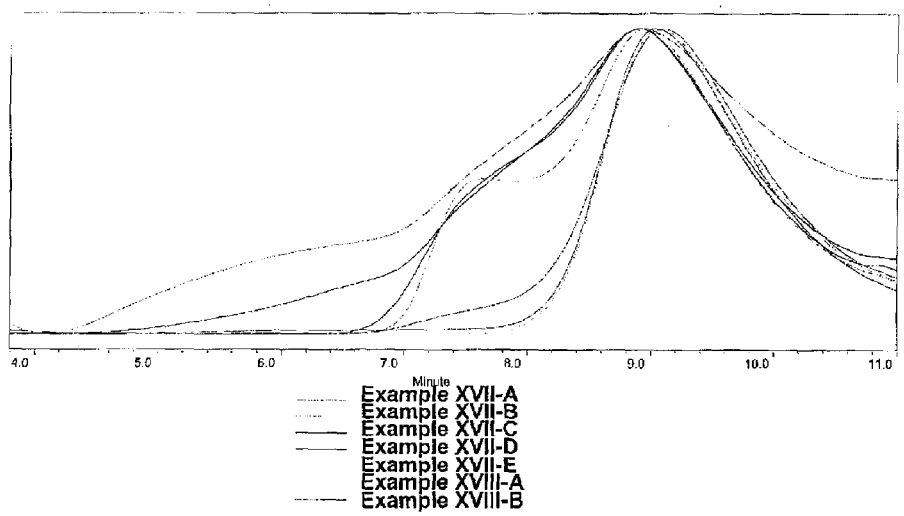
Figure 8. GPC curve for Examples XVII and XVIII

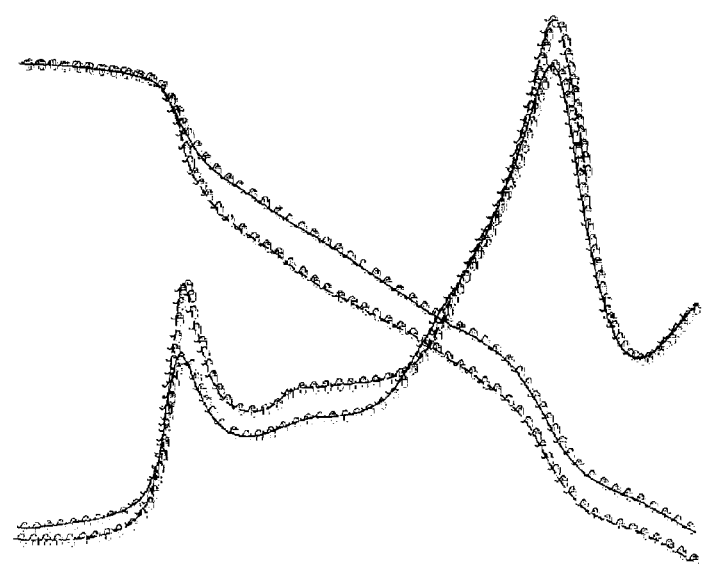
Figure 9. Rheological Analysis of Examples XVI and XVII.

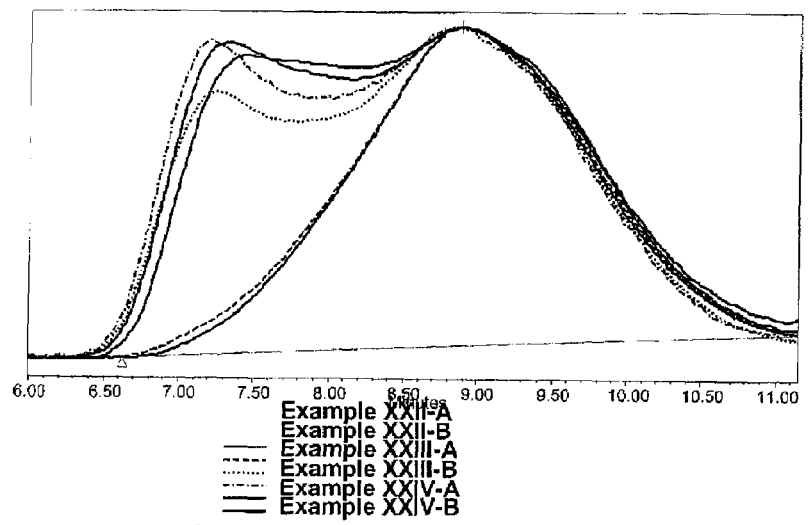
Figure 10. GPC curves for Examples XXII, XXIII, and XXIV
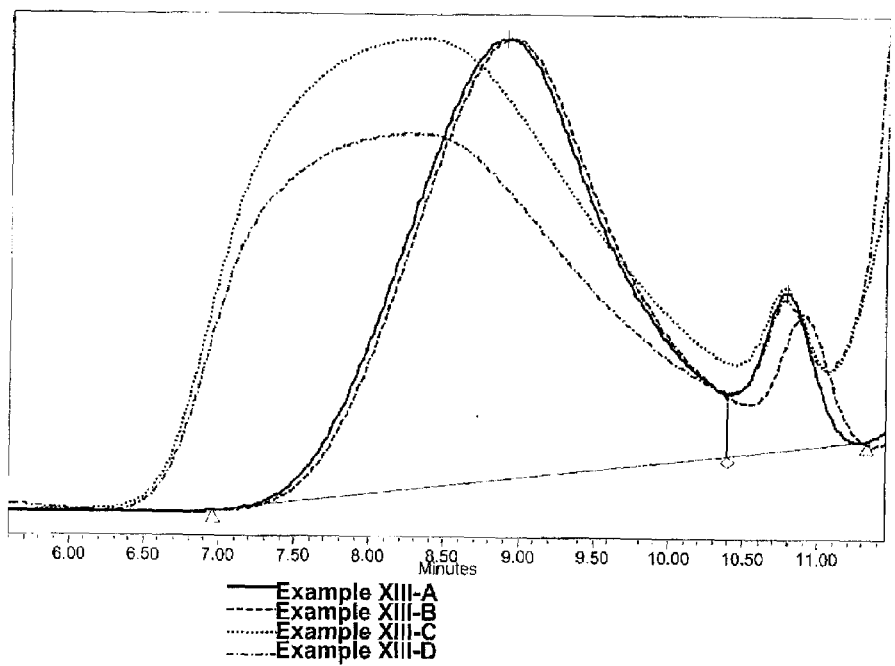
Figure 11. GPC curves for Examples XIII

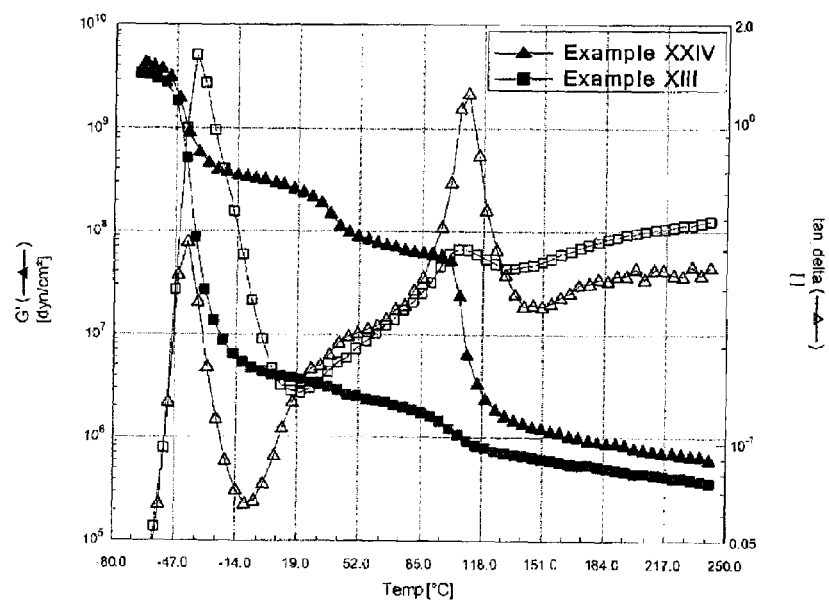
Figure 12. Rheological Analysis for Examples XIII and XXIV.

DISPERSIONS CONTAINING LIVING RADICALS

CROSS REFERENCE TO RELATED APPLICATIONS

This application is a continuation-in-part of U.S. patent application Ser. No. 11/002,051, filed Dec. 2, 2004 now abandoned, which is a divisional application of U.S. patent application Ser. No. 10/632,764, filed Aug. 1, 2003 and issued as U.S. Pat. No. 6,841,636 on Jan. 11, 2005, which claims the benefit of U.S. Provisional Application No. 60/404,557, filed 19 Aug. 2002.

FIELD OF THE INVENTION

The invention relates to a dispersion of polymer particle, where the polymer particles contain, on average, one or more than one living radical per particle, where the living radicals are not chemically protected. The living radicals can then be used to form polymers with a controlled architecture.

BACKGROUND OF THE INVENTION

Free radical polymerization is a preferred technique in the synthesis of many polymers. One drawback of free radical polymerization is the lack of control over the polymer architecture produced. The type and amount of initiator, temperature, and delayed monomer feeds have all been used to control the final structure and size of the polymer particles.

Living polymers offer some control of the polymer structure. Living polymers are polymers having an active/growing end on a polymer chain (non-terminated polymer chain). Most commonly, living ends are formed by anionic polymerization in non-polar solvent, or involve a capping-mechanism to stop a growing free radical, then restarting the polymer growth by reversible removal of the cap.

Chemical trapping agents, polymerization mediators, or polymerization control agents are known in the art as a means of capping, or coupling with, a living polymer radical by a reversible means, then uncapping the living radical for latter continued polymerization. The capping, coupling or control mechanism could be reversible termination, chain transfer, complexation, the use of stable free radical forming agents, or other such chemical means that can be used to control radical activity. Unfortunately such a method requires additional purification costs to remove the trapping agent from the product. The trapping agents also add kinetic limitations, dependent on the specific trapping agent used.

U.S. Pat. No. 5,173,551 and "Studies of the Polymerization of Methacrylic Acid via Free-Radical Retrograde Precipitation Polymerization Process", J. Applied Polymer Science, Vol. 62, 2039-2051 (1996) describe the use of a free-radical retrograde polymerization process as a means of controlling the polymer molecular weight distribution. In this process a monomer mixture in a solvent is initiated by a solvent-soluble free radical initiator to produce polymer radicals that precipitate into polymer-rich phases in a solvent. The above patent also addresses the capability of FRRPP to control the activity of polymer radicals and use them to produce copolymers. Additionally it provides a detailed description of the original process, a possible apparatus for running it, and ways of regulating the rate of reaction through changing temperature and adding or removing monomers or inert diluents.

U.S. patent application Ser. Nos. 10/045,881 and 10/045,725 describe free radical dispersions and copolymers that can be made by free radical retrograde precipitation. One drawback of FRRPP is that it requires poor solvents that precipitate a polymer above the lower critical solution temperature.

There is a need for a method to control polymer architecture, without the drawbacks found in the current art.

Surprisingly it has been found that a stable dispersion of particles having an average of one or more than one living radical per particle can be produced without chemical capping agents or mediation, and without the need to produce said radicals and particles through a free radical retrograde precipitation polymerization process.

SUMMARY OF THE INVENTION

The present invention is directed to a dispersion of polymer particles, the particle containing, on average, one or more than 1 living radicals each, the radicals not being chemically protected. The invention is also directed to a free radical polymerization process resulting in a dispersion containing polymer particles having on average one or more living radicals. The process involves carefully regulating the polymerization conditions to under monomer-starved conditions, to produce small size particles containing, on average, one or more than one living radical. This can also be achieved by introducing controlled amounts of initiator into the reactor. These living polymer radicals can be further reacted with additional monomer(s), either the same monomer to increase the polymer molecular weight, or another monomer or monomers to form block copolymers, tapered block polymers, or controlled architecture compositions. The additional polymerization(s) can occur without the need for additional initiator.

BRIEF DESCRIPTION OF THE DRAWINGS

FIG. 1 is a chart of particle size evolution.
FIG. 2 is a GPC curve representing six in-process samples
FIG. 3 is a GPC curve representing six in-process samples
FIG. 4 is a GPC curve representing four in-process samples.
FIG. 5 is GPC curve representing one sample.
FIG. 6 is a GPC curve representing one sample.
FIG. 7 is a GPC curve representing two different samples.
FIG. 8 is a GPC curve representing two different samples.
FIG. 9 is a Theological analysis of two different samples.
FIG. 10 is a GPC curve representing three different samples and their in-process samples.
FIG. 11 is a GPC curve representing four in-process samples.
FIG. 12 is a Theological analysis of two different samples.

DETAILED DESCRIPTION OF THE INVENTION

As used herein, the term "dispersion" is used to mean a continuous phase having within it a dispersed phase. The dispersed phase exists as discreet domains or particles and may be stabilized, if necessary, by a surfactant or stabilizer. The term "dispersion" is used to apply to many possible material compositions, including, but not limited to, emulsions, mini-emulsions, micro-emulsions, precipitation, colloidal dispersions, and colloidal suspensions.

The term "stabilizer" as used herein, means surfactants, stabilizers, and other dispersion aids.

While not being bound by any particular theory, it is believed that the small particle size, plus careful control of initiator and monomer additions produces stable particles with radicals trapped inside. Due to the small particle size, the radicals are sterically hindered or have greatly reduced physical mobility, resulting in very reduced rates of termination. These radicals can then participate in chain transfer and/or extension reactions and lead to block and/or graft copolymers.

The process for producing the polymer dispersion of the present invention involves carefully regulating polymerization conditions to create and maintain small particles containing trapped radicals. This is accomplished by carefully regulating the initiator, monomer, and stabilizer concentrations. This allows for a maximization of particle nucleation and a minimization of particle size.

The process can also involve introducing carefully regulated amounts of initiator into the emulsion prior to the addition of subsequent monomer. The radicals initiated by this initiator could balance any radicals consumed due to premature termination. The amount of initiator should be carefully controlled to be low enough as an inordinately high number of radicals would result in premature termination, whereas a very low number of radicals would have no significant impact on the kinetics. The combination of a mechanism for generating radicals, either in prior polymerization stages or by the introduction of controlled amounts of initiator into the reactor, combined with the polymerization control mechanism of this process lead to controlled architecture polymers and their dispersions.

The polymer dispersions of the present invention generally have water as the continuous phase. A continuous phase of a mixed aqueous solvent, such as water/miscible alcohol could also be used. Additionally, an inverse emulsion process could also be employed. Other continuous phases could also be used. The general description and examples which follow describe primarily a water-continuous phase. Those of skill in the art can apply the same concepts and techniques to other polymerization systems.

In the first stage of the polymerization, water, stabilizer, and free radical initiator are added to the reactor, and conditions are adjusted for the production of free-radicals. The radicals may be generated by thermal, redox, U.V., gamma radiation, or other methods, depending on the initiator system chosen. Combinations of initiators and initiation strategies could also be used for radical generation. Following formation of free radicals, the monomer feed is added, maintaining a monomer-starved condition. The reaction will become initiator starved toward the latter part of the initial reaction stage.

The first phase of the polymerization results in a dispersion of polymer particles in the dispersing medium, preferably water. Each polymer particle contains on average one or more living polymer radicals. Preferably the particles contain on average at least 2 living polymer radicals, more preferably at least 5 living polymer radicals, even more preferably at least 10 living polymer radicals, and most preferably at least 20 living polymer radicals. Particles having over 100, 1000, or even 10,000 and more living polymer radicals per polymer particle have been produced. The living polymer particles of the present invention exist without chemical capping, mediation, or control agents which are known in the art and which are added to temporarily protect the living radical.

The living radicals trapped in the particles of the dispersion under thermal initiation conditions remain for a period of longer than seven initiator half-lives, for at least a few minutes, preferably for at least 15 hours, and most preferably for more than a few days. Trapped living radicals in redox and other initiator systems are also long lived—remaining for at least a few minutes or longer.

Once the dispersed monomer has reacted to high conversion, often near 100 percent, generally at times up to 5 to 10 initiator half lives, additional monomer can be added to the polymer particles containing multiple living radicals. In the case of addition of the same monomer, polymer of a higher molecular weight will be formed. Since termination of the particles is controlled, the polymer molecular weight can be controlled to produce any desired molecular weight, with molecular weights of greater than 3,000,000 possible. The additional monomer can also be one or more different monomers, leading to the formation of a block copolymer. The process of the invention can produce a pure block copolymer, since virtually all of the first stage monomer can be consumed prior to introduction of the second monomer. The second stage monomer can advantageously be quite different than the first stage monomer, as in the case where one monomer is hydrophilic and the other hydrophobic. Amphiphilc block copolymers and novel block copolymer combinations are possible using the process of the present invention. The process is not limited by reactivity ratios, but is rather limited only by diffusion. Tapered polymer compositions can also be produced by the control over the reaction offered by the process of the invention. Chain transfer to polymer in the particles can lead to graft or comb-like architectures. It can also lead to significant branching and can lead to highly branched or hyperbranched copolymers, with a blocky or graft/comb-like architecture depending on monomer choice.

The process of adding additional monomer may be continued for any number of stages, without the need for additional initiator.

Optionally, if any additional initiator is added to the reactor after stage 1, any initiation strategy used for the first stage of polymerization or any alternate initiation strategy could be used. The amount of initiator used should be carefully regulated.

Monomers useful in the present invention include any monomer that can undergo free radical chain polymerization. Especially useful monomers are ethylenically unsaturated monomers. Examples include (meth)acrylates; maleates; vinyl esters; itaconates; vinyl ethers; styrenics; unsaturated hydrocarbons; nitrogen functional monomers such as acrylonitrile, alkyl acrylamides n-vinyl formamide, vinyl pyrrolidone, zwitterionic or ampholytic monomers; hydroxyl-functional monomers; macromers; (meth)acrylic acid, and N-caprolactam. The term (meth) acrylates, as used herein, refers to both acrylate as well as methacrylate monomers and their derivatives. Similarly, the term (meth) acrylic acids refers to acrylic acid, methacrylic acid and their derivatives. Low levels of crosslinking monomers may also be used as known in the art to improve certain properties of the polymers.

The initial charge may optionally contain a polymer latex seed. It is believed that the use of a polymer latex seed can be advantageous for trapping initiated polymer radicals. The seed may be formed in situ by introducing a small amount of monomer into the initial charge, and polymerizing said monomer prior to the commencement of the delayed monomer feed.

The dispersion may be stabilized by means of a surfactant, stabilizer, other dispersion aids and dispersants, or a mixture thereof. Surfactants useful in the present invention include anionic, non-ionic, cationic and amphoteric surfactants. Preferred surfactants are non-ionic, such as alkyl phenol ethoxylates, alkyl ethoxylates, or other ethoxylates. Other surfactants include, but are not limited to alkyl phenol, alkyl sulfate, ether sulfate, phosphate ester, and similar anionic surfactants. Stabilizers can be either polymeric or non-polymeric and include, but are not limited to polyvinyl alcohols, and amphiphilic block copolymer stabilizers. Polymeric dispersants include but are not limited to, poly(maleic acid) and copolymers of maleic acid with compatible ethylenically unsaturated monomers such as mono- and diesters of maleic acid, (meth)acrylic acid, alkyl esters of (meth)acrylic acid, hydroxyalkyl esters of (meth)acrylic acid, alpha-methyl styrene, styrene, and derivatives thereof, vinyl acetate, crotonic acid, esters of crotonic acid, and acrylamide, and derivatives thereof. Other suitable linear polymeric dispersants include, but are not limited to, polystyrene sulfonates, which are typically obtained by sulfonating poly(styrene) or copolymers of styrene with compatible ethylenically unsaturated monomers including, but not limited to, (meth)acrylic acid, esters of (meth)acrylic acid, maleic acid, and mono- and diesters of maleic acid; condensates including but not limited to naphthalenesulfonic acid-formaldehyde condensate and melamine-formaldehyde condensate. Certain natural or naturally derived polymers useful in the present invention include but are not limited to tannins, lignins, lignosulfates, alginates, dispersed or soluble starches and modified starches, and cellulosic polymers. Other stabilizing and dispersing aids may include copolymerizable compounds, such as sodium vinyl sulfonate, that may help in the stabilization. A mixture of one or more surfactants, stabilizers, dispersants, or a combination of surfactants and stabilizers is also useful in the invention.

The polymerization occurs due to free radical initiation. The free-radical generating agent is capable of generating free radicals to initiate polymerization by the use of one or more mechanisms such as photochemical initiation, thermal initiation, redox initiation, degradative initiation, ultrasonic initiation, U.V. initiation, gamma ray initiation, or the like. Preferably the initiators are selected from azo-type initiators, peroxide type initiators, or mixtures thereof. Examples of suitable peroxide initiators include, but are not limited to, diacyl peroxides, peroxy esters, peroxy ketals, dialkyl peroxides, and hydroperoxides, specifically benzoyl peroxide, deconoyl peroxide, lauroyl peroxide, succinic acid peroxide, cumene hydroperoxide, t-butyl peroxy acetate, 2,2-di(t-butyl peroxy)butane diallyl peroxide), cumyl peroxide, or mixtures thereof. Examples of suitable azo-type initiators include, but are not limited to azobisisobutyronitrile (AIBN), 1,1'-azobis(1-cyclohexane carbonitrile), acid-functional azo-type initiators such as 4,4'-azobis(4-cyanopentanoic acid. Preferably the dispersing agent is water, and the free-radical generating agent is a water-soluble initiator, such as 2,2'-Azobis(N,N'-amidinopropane)dihydrochloride or 2,2'-Azobis(N,N'-dimethyleneisobutyramidine)dihydrochloride. The free radicals react with monomer present in equilibrium amounts in the aqueous phase to form polymer chains.

In another manifestation of this process, it has been discovered that the population of trapped radicals can be generated by the addition of small amounts of initiator to the reactor prior to the addition of monomers in subsequent stages. The number of initiator molecules is in the range of 0.001 to 10000 times the number of polymer particles present in the reactor. Preferably the number of initiator molecules is in the range of 0.01 to 1000, more preferably it is in the range of 0.1-1000 and it may also be in the range of 0.1-100. Without being limited by any particular mechanism, the mechanism of this process is proposed to be the initiation of polymer molecules that enter the polymer particles and then can be trapped within the particles to initiate further polymerization by reacting with other monomer molecules. They could also participate in chain transfer reactions to the polymer that is already present in the reactor to lead to block or graft copolymers.

The reaction of the present invention is not limited by reactor geometry. The reaction may be a batch polymerization, semi-batch polymerization, or a continuous polymerization such as in a tubular reactor. The polymerization may occur at atmospheric pressure, or at elevated pressure.

The control mechanism of the polymerization is not critically affected by the glass transition temperature of the polymer product.

Particle size can be controlled by the type and amount of surfactant or stabilizer used as well as during the making and processing of the dispersion. The particle size is kept very small. While not being bound to any particular theory, it is believed that the radicals remain living in part due to being sterically hindered or physically immobilized within a small particle. The average particle size in the first stage is preferably from 1 to 300 nanometers, more preferably from 10 to 200 nanometers, and even more preferably from 10 to 150 nanometers. The particle size distribution can be adjusted from a relatively broad and multi-modal distribution, to a nearly unimodal distribution. The particle size in the second stage is generally greater than 100 nanometers, and may be up to several microns.

The solids levels of the copolymer dispersions can be in the range of from 5 to 65 percent by weight, and preferably from 10 to 30 percent by weight.

Termination of the polymer radicals can be accomplished by one or more steps such as reducing the temperature of the reaction chamber, increasing the pressure within the reaction chamber; adding a suitable solvent for the resulting polymer; adding a suitable chain transfer agent (e.g., a mercaptan type agent) to the system; or by introducing a suitable radical scavenger (e.g., oxygen).

The polymerization method may be used to produce high molecular weight homopolymers, and block copolymer architectures including di-blocks, tri-blocks, and tapered blocks. The composition of the blocks can be tailored by adjusting the compositions of the monomer feeds. Other polymer architectures which may be produced include, but are not limited to, multiblocks, grafts; comb structures, blocky-grafts, difunctional initiation polymers, and radial polymers.

Polymer dispersions produced by the present invention may be used in adhesives, paints, industrial coatings, inks, film-formers, polymeric surfactants, stabilizers, tougheners, binders, non-woven materials, specialty additives, rheology modifiers, thermoplastic elastomers, polymeric compatibilizers, bio-adhesives, encapsulants for controlled release, nanoparticles, nanogels, redispersible powders, membranes, organic-inorganic composites, porous membranes, structural polymers, engineered plastics, breathable membranes, medical implants, bio-compatable polymers, and a variety of other commercial applications.

The method of the invention allows for economical production of copolymers that are difficult to obtain by other means, such as, but not limited to, polyvinyl acetate-block-polystyrene, polyvinyl ethers—block-polystyrene, polyvinyl esters-block-poly(meth)acrylates such as polyvinyl acetate—block—polymethylmethacrylate.

The following examples are presented to further illustrate and explain the present invention and should not be taken as limiting in any regard. All polymers were obtained as stable emulsions. The copolymers obtained were characterized using thermal analysis (differential scanning calorimetry), rheological analysis, and fractionation/solvent extraction to verify their blocky structure. Examples I to X present examples of polymerization control with no additional initiator except that added in the beginning of polymerization. Examples XI and XII are comparative examples showing the impact of residual second stage inhibitor on second stage conversion. Examples XIII onwards show the ability to synthesize controlled architecture polymers by introducing small amounts of initiator after stage I into different polymer emulsions.

EXAMPLE I

Stage I: Water (150 mL), surfactant (sodium dodecyl sulfate, Rhodia) (3 g.), and initiator (0.3 g.) (2,2"-Azobis(N,N'-amidinopropane)dihydrochloride or V-50, Wako chemicals) in a 4 necked round bottom flask were purged with nitrogen for 45 min. Uninhibited styrene monomer (33 mL) in a slow add funnel was purged with subsurface nitrogen for 30 min. Reaction mixture was heated to 80° C. while stirring over 20 min. At 50° C. (7 mL) of styrene monomer was slow added over 5 min and remaining monomer was slow added over 3 hours.

Stage II: Reaction mixture was cooled to 60° C. A pre-emulsion was made by adding uninhibited butyl acrylate (78.3 mL) dropwise to a beaker containing water (25 mL), and surfactant (sodium dodecyl sulfate, Rhodia) (2.1 g.) while mixing very vigorously using a mixer. The pre-emulsion was purged with nitrogen for 30 min in a slow addition funnel and slow added over 1 hour at 60° C. Reaction mixture was stirred for 3 hours at 60° C. and then was cooled to room temperature.

EXAMPLE II

Stage I: Water (150 mL), surfactant (sodium dodecyl sulfate, Rhodia) (3 g.), and initiator (0.3 g.) (2,2"-Azobis(N,N'-amidinopropane)dihydrochloride or V-50, Wako chemicals) in a 4 necked round bottom flask were purged with nitrogen for 45 min. Uninhibited styrene monomer (33 mL) in a slow add funnel was purged with subsurface nitrogen for 30 min. Reaction mixture was heated to 80° C. while stirring over 20 min. At 50° C. (7 mL) of styrene monomer was slow added over 5 min and remaining monomer was slow added over 3 hours.

Stage II: Reaction mixture was cooled to 60° C. A pre-emulsion was made by adding uninhibited styrene (77.0 mL) dropwise to a beaker containing water (25 mL), and surfactant (sodium dodecyl sulfate, Rhodia) (2.1 g.) while mixing very vigorously using a mixer. The pre-emulsion was purged with nitrogen for 30 min in a slow addition funnel and slow added over 1 hour at 60° C. Reaction mixture was stirred for 3 hours at 60° C. and then was cooled to room temperature.

EXAMPLE III

Stage I: Water (150 mL), surfactant (sodium dodecyl sulfate, Rhodia) (3 g.), and initiator (0.3 g.) (2,2"-Azobis(N,N'-amidinopropane)dihydrochloride or V-50, Wako chemicals) in a 4 necked round bottom flask were purged with nitrogen for 45 min. A mixture of uninhibited styrene and methacrylic acid monomer (35 mL) in a slow add funnel was purged with subsurface nitrogen for 30 min. Reaction mixture was heated to 80° C. while stirring over 20 min. At 50° C. (7 mL) of monomer mix was slow added over 5 min and remaining monomer was slow added over 3 hours.

Stage II: Reaction mixture was cooled to 60° C. A pre-emulsion was made by adding uninhibited butyl acrylate (78.3 mL) dropwise to a beaker containing water (25 mL), and surfactant (sodium dodecyl sulfate, Rhodia) (2.1 g.) while mixing very vigorously using a mixer. The pre-emulsion was purged with nitrogen for 30 min in a slow addition funnel and slow added over 1 hour at 60° C. Reaction mixture was stirred for 3 hours at 60° C. and then was cooled to room temperature.

EXAMPLE IV

Stage I: Water (150 mL), surfactant (sodium dodecyl sulfate, Rhodia) (3 g.), and initiator (0.3 g.) (2,2'-azobis[2-(2-imidazolin-2-yl)propane]dihydrochloride or VA-044, Wako chemicals) in a 4 necked round bottom flask were purged with nitrogen for 45 min. Uninhibited styrene monomer (35 mL) in a slow add funnel was purged with subsurface nitrogen for 30 min. Reaction mixture was heated to 65° C. while stirring over 20 min. At 50° C. (7 mL) of styrene monomer was slow added over 5 min and remaining monomer was slow added over 3 hours.

Stage II: Reaction mixture was cooled to 60° C. A pre-emulsion was made by adding uninhibited butyl acrylate (78.3 mL) dropwise to a beaker containing water (25 mL), and surfactant (sodium dodecyl sulfate, Rhodia) (2.1 g.) while mixing very vigorously using a mixer. The pre-emulsion was purged with nitrogen for 30 min in a slow addition funnel and slow added over 1 hour at 60° C. Reaction mixture was stirred for 3 hours at 60° C. and then was cooled to room temperature.

EXAMPLE V

Stage I: Water (203 mL), surfactant (Igepal CA-897 Octylphenol ethoxylate, Rhodia) (2.9 g.), and initiator (0.2 g.) (2,2'-azobis[2-(2-imidazolin-2-yl)propane]dihydrochloride or VA-044, Wako chemicals) in a 4 necked round bottom flask were purged with nitrogen for 45 min. Uninhibited styrene (31 mL) in a slow addition funnel was purged with subsurface nitrogen for min. At room temperature styrene monomer slow addition was started and 3 mL styrene was slow added over 5 min. Reaction mixture was heated to 75° C. while stirring over 15 min. Remaining monomer was slow added over 1.5 hours. At the end of styrene slow addition, reaction mixture was stirred for 1.5 hours while cooling to 60° C.

Stage II: Uninhibited styrene (30 mL) was purged with nitrogen for 30 min in a slow addition funnel and slow added over 2 hours at 60° C. Reaction mixture was stirred for 1 hour at 60° C. and then was cooled to room temperature.

EXAMPLE VI

Stage I: Water (200 mL), surfactant (Igepal CA-897 Octylphenol ethoxylate, Rhodia) (3.9 g.), and initiator (0.1 g.) (2,2"-Azobis(N,N'-amidinopropane)dihydrochloride or V-50, Wako chemicals) in a 4 necked round bottom flask were purged with nitrogen for 45 min. Uninhibited styrene (21 mL) in a slow addition funnel was purged with subsurface nitrogen for 30 min. At room temperature styrene monomer slow addition was started. Reaction mixture was heated to 80° C. while stirring over 10 min, 5 mL styrene was slow added over 10 min before reaction temperature reached 80° C. and remaining monomer was slow added over 1.5 hours. At the end of styrene slow addition, reaction mixture was stirred at 80° C. for 1.5 hours. Samples were taken at irregular intervals to determine conversion and molecular weight.

Stage II: Reaction mixture was cooled to 60° C. Uninhibited styrene (36 mL) was purged with nitrogen for 30 min in a slow addition funnel and slow added over 2 hours at 60° C. Reaction mixture was stirred for 2 hours at 60° C. and then was cooled to room temperature. Samples were taken periodically to determine conversion and molecular weight.

EXAMPLE VII

Stage I: Water (175 mL), surfactant (sodium dodecyl sulfate, Rhodia) (2.5 g.), and initiator (0.5 g.) (2,2"-Azobis(N,N'-amidinopropane)dihydrochloride or V-50, Wako chemicals) in a 4 necked round bottom flask were purged with nitrogen for 45 min. Uninhibited styrene (55 mL) in a slow addition funnel was purged with subsurface nitrogen for 30 min. Reaction mixture was heated to 80° C. while stirring over 20 min. At 50° C. (7 mL) of monomer mix was slow added over 5 min and remaining monomer was slow added over 3 hours.

Stage II: Reaction mixture was cooled to 60° C. Uninhibited styrene (55 mL) was purged with nitrogen for 30 min in a slow addition funnel and slow added over 1 hour at 60° C. Reaction mixture was stirred for 3 hours at 60° C. and then was cooled to room temperature.

EXAMPLE VIII

Stage I: Water (200 mL), surfactant (Igepal CA-897 Octylphenol ethoxylate, Rhodia) (3.9 g.), and initiator (0.1 g.) (2,2"-Azobis(N,N'-amidinopropane)dihydrochloride or V-50, Wako chemicals) in a 4 necked round bottom flask were purged with nitrogen for 45 min. Uninhibited styrene (20.7 mL) in a slow addition funnel was purged with subsurface nitrogen for 30 min. At room temperature styrene monomer slow addition was started while heating to 80° C. and 5 mL styrene was slow added over 20 min before reaction temperature reached 80° C. and remaining monomer was slow added over 1.5 hours. At the end of styrene slow addition, reaction mixture was stirred at 80° C. for 30 min.

Stage II: Reaction mixture was cooled to 60° C. Uninhibited styrene (35 mL) was purged with nitrogen for 30 min in a slow addition funnel and slow added over 2 hours at 60° C. Reaction mixture was stirred for 2 hours at 60° C. and then was cooled to room temperature.

EXAMPLE IX

Stage I: Water (200 mL), surfactant (Igepal CA-897 Octylphenol ethoxylate, Rhodia) (3.9 g.), and initiator (0.19 g.) (2,2"-Azobis(N,N'-amidinopropane)dihydrochloride or V-50, Wako chemicals) in a 4 necked round bottom flask were purged with nitrogen for 45 min. Uninhibited vinyl acetate (21 mL) in a slow addition funnel was purged with subsurface nitrogen for 30 min. At room temperature vinyl acetate monomer slow addition was started while heating to 80° C. Five mL vinyl acetate was slow added over 20 min before reaction temperature reached 80° C. and remaining monomer was slow added over 1.5 hours. At the end of monomer slow addition, reaction mixture was stirred at 80° C. for 30 min.

Stage II: Reaction mixture was cooled to 60° C. Uninhibited styrene (41 mL) was purged with nitrogen for 30 min in a slow addition funnel and slow added over 2 hours at 60° C. Reaction mixture was stirred for 2 hours at 60° C. and then was cooled to room temperature.

EXAMPLE X

Stage I: Water (200 mL), surfactant (sodium dodecyl sulfate, Rhodia) (5.1 g.), and initiator (0.3 g.) (2,2"-Azobis(N,N'-amidinopropane)dihydrochloride or V-50, Wako chemicals) in a 4 necked round bottom flask were purged with nitrogen for 45 min. Uninhibited methyl methacrylate (33 mL) in a slow addition funnel was purged with subsurface nitrogen for 30 min. At room temperature methyl methacrylate (MMA) monomer slow addition was started while heating to 80° C. Three mL MMA was added to the flask in 5 min before the temperature reached 80° C. and the remaining monomer was slow added over 2.5 hours. At the end of monomer slow addition, reaction mixture was stirred at 80° C. for 30 min.

Stage II: Reaction mixture was cooled to 60° C. Uninhibited n-butyl acrylate (78 mL) was purged with nitrogen for 30 min in a slow addition funnel and slow added over 1 hour at 60° C. Reaction mixture was stirred for 2 hours at 60° C. and then was cooled to room temperature.

Examples XI and XII show the impact of residual inhibitor from the monomer stock on second stage monomer conversion. Example XI used monomer with a higher level of inhibitor than example XII. It can be seen that second stage conversion was not observed in example XI (Table I). Methyl methacrylate monomer was used as is, without removing inhibitor. Inhibitor was removed from butyl acrylate by allowing it to pass through inhibitor remover packing.

EXAMPLE XI

Stage I: Water (200 mL), surfactant (Igepal CA-897 Octylphenol ethoxylate, Rhodia) (4.2 g.), and initiator (0.1 g.) (2,2"-Azobis(N,N'-amidinopropane)dihydrochloride or V-50, Wako chemicals) in a 4 necked round bottom flask were purged with nitrogen for 45 min. Uninhibited styrene (21 mL) in a slow addition funnel was purged with subsurface nitrogen for 30 min. Reaction mixture was heated to 80° C. while stirring over 20 min. At room temperature styrene monomer slow addition was started and 5 mL styrene was slow added over 10 min before reaction temperature reached 80° C. and remaining monomer was slow added over 1.5 hours. At the end of styrene slow addition, reaction mixture was stirred at 80° C. for 30 min.

Stage II: Reaction mixture was cooled to 60° C. Uninhibited butyl acrylate (36 mL) was purged with nitrogen for 30 min in a slow addition funnel and slow added over 2 hours at 60° C. Reaction mixture was stirred for 2 hours at 60° C. and then was cooled to room temperature.

EXAMPLE XII

Stage I: Water (200 mL), surfactant (Igepal CA-897 Octylphenol ethoxylate, Rhodia) (4.2 g.), and initiator (0.1 g.) (2,2"-Azobis(N,N'-amidinopropane)dihydrochloride or V-50, Wako chemicals) in a 4 necked round bottom flask were purged with nitrogen for 45 min. Uninhibited styrene (21 mL) in a slow addition funnel was purged with subsurface nitrogen for 30 min. Reaction mixture was heated to 80° C. while stirring over 20 min. At room temperature styrene monomer slow addition was started and 5 mL styrene was slow added over 10 min before reaction temperature reached 80° C. and remaining monomer was slow added over 1.5 hours. At the end of styrene slow addition, reaction mixture was stirred at 80° C. for 30 min.

Stage II: Reaction mixture was cooled to 60° C. Uninhibited butyl acrylate (36 mL) was purged with nitrogen for 30 min in a slow addition funnel and slow added over 2 hours at 60° C. Reaction mixture was stirred for 2 hours at 60° C. and then was cooled to room temperature.

For all given examples, samples were taken periodically to determine conversion, particle size, and molecular weight. Conversion was determined gravimetrically and molecular weight was determined using size exclusion chromatography on a Waters Associates system using Waters Styragel columns and polystyrene standards. Particle size was determined for these examples using a Brookhaven Instruments BI90 or BI90 plus particle size analyzer. The conversion, molecular weight, and particle size data is given in Table I.

To extract homopolymer and polymer which is rich in one monomer, Soxhlet extraction was conducted on dried polymer using two different solvents based on the solubility of each polymeric component. Glass transition temperature of all residues was measured using a TA Instruments Differential Scanning Calorimeter. Proton NMR was spectroscopy was conducted on all extracted and residue phases to determine composition using a Bruker NMR spectrometer. Soxhlet extraction results for example III are shown in Table II. The evolution of particle size with time for example 1 is shown in FIG. 1. GPC chromatograms of examples II, I, VII, and VIII are in FIGS. II, III, IV, and V respectively.

EXAMPLE XIII

Stage I: Water (150 mL), surfactant (Igepal CA-897 Octylphenol ethoxylate, Rhodia) (3 g.), and initiator (0.2 g.) (2,2"-Azobis(N,N'-amidinopropane)dihydrochloride or V-50, Wako chemicals) in a 4 necked round bottom flask were purged with nitrogen for 45 min. Uninhibited styrene (21 mL) in a slow addition funnel was purged with subsurface nitrogen for 30 min. Reaction mixture was heated to 80° C. while stirring over 20 min. At room temperature styrene monomer slow addition was started and 5 mL styrene was slow added over 10 min before reaction temperature reached 80° C. and remaining monomer was slow added over 1.5 hours. At the end of styrene slow addition, reaction mixture was stirred at 80° C. for 1 hour and 30 min.

Stage II: Reaction mixture was cooled to 60° C. At 60° C. before starting butyl acrylate addition, initiator (0.05 g.) (2,2"-Azobis(N,N'-amidinopropane)dihydrochloride or V-50 was added to the flask. Uninhibited butyl acrylate (36 mL) was purged with nitrogen for 30 min in a slow addition funnel and slow added over 2 hours at 60° C. Reaction mixture was stirred for 2 hours at 60° C. and then was cooled to room temperature.

EXAMPLE XIV

A master batch of first stage polymerization of methyl methacrylate was prepared as stage I. Small amount (200.0 g.) of prepared polyMMA was used to carry out reactions with butyl acrylate in the presence of different levels of initiator as stage II. Water (1500 mL), surfactant (sodium dodecyl sulfate, Rhodia) (30.0 g.), and initiator (3.0 g.) (2,2"-Azobis(N,N'-amidinopropane)dihydrochloride or V-50, Wako chemicals) in a 3 L four neck round bottom flask were purged with nitrogen for 45 min. Uninhibited methyl methacrylate monomer (330 mL) in a slow add funnel was purged with subsurface nitrogen for 30 min. Reaction mixture was heated to 80° C. while stirring over 20 min. At 50° C. (20 mL) of methyl methacrylate monomer was slow added over 5 min and remaining monomer was slow added over 2.5 hours. Reaction mixture was heated for 9.5 h at 80° C. The objective is to exhaust the initiator and use this emulsion for initiator doping experiments. Reaction mixture was cooled to room temperature and analyzed for % Solids, PS, and molecular weight. The conversion, particle size, and molecular weight data is given in Table III.

TABLE I

Conversion and molecular weight data for examples

| Example | Overall Conversion Stage I | Final | % Solids[1] | Particle Size (nm) Stage I | Final | Molecular weight (Mn)[2] Stage I | Final |
|---|---|---|---|---|---|---|---|
| I | 83.21 | 95.93 | 36 | 36 | 45 | 28,000 | 1,136,000 |
| II | 73.56 | 66 | 25 | 127 | 61 | 25,000 | 120,000 |
| III | 75.7 | 64.38 | 23 | — | 84 | 18,000 | 2,476,000 |
| IV | 80.47 | 96.99 | 34 | 153 | 144 | 135,000 | 138,000 |
| V | 80.14 | 69.12 | 16 | 78 | 149.5 | 58,000 | 116,000 |
| VI | 82.54 | 86.36 | 20 | 63.7 | 553.8 | 1,539,000 | 1,580,000 |
| VII | 70.57 | 66.93 | 22 | 273 | 127 | 9,000 | 40,000 |
| VIII | 83.2 | 96 | 21 | 59 | 105 | 41,000 | 135,000 |
| IX | 76.4 | 81.5 | 23 | 53 | 88 | 11,000 | 1,458,000 |
| X | 94.2 | 81.9 | 30 | 21 | 67 | 15000 | 25,000 |
| XI | 89.75 | 36.66 | 9 | 57.7 | 91 | 77,000 | 52,000 |
| XII | 85.96 | 68.03 | 16 | 58.4 | 141.2 | 103,000 | NA |

TABLE II

Soxhlet Extraction Results

| | Weight % | $T_g$ ° C. | | NMR mol % composition BA | MMA | Styrene |
|---|---|---|---|---|---|---|
| Example III (Dried Polymer) | — | −55.98 | −25.07 | 104 | 48.05 | 51.95 | |
| Example III (Soxhlet Extraction in Acetone): | | | | | | | |
| flask | 53 | −54.7 | — | 103 | 54.8 | 45.2 | — |
| thimble | — | −52.89 | — | 101 | 51.04 | 48.96 | — |
| Example III (Soxhlet Extraction in ethyl acetate): | | | | | | | |
| flask | 38.8 | −54.09 | — | 117 | 48.33 | 51.67 | — |
| thimble | 8.2 | −51.7 | — | 110 | 51.81 | 48.19 | — |

EXAMPLE XV

PolyMMA prepared as in Example XIII (200.0 g.) and initiator (0.00066 g.) (2,2'-azobis[2-(2-imidazolin-2-yl)propane]dihydrochloride or VA-044, Wako chemicals) were charged to a 1 L four neck round bottom flask. Reaction mixture was nitrogen purged at room temperature for 1 h. Inhibitor free butyl acrylate (71.2 g.) was charged to an addition funnel and was purged with nitrogen for 30 min. Reaction mixture was heated to 60° C. while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table III.

EXAMPLE XVI

PolyMMA prepared as in Example XIII (200.0 g.) and initiator (0.0066 g.) (2,2'-azobis[2-(2-imidazolin-2-yl)propane]dihydrochloride or VA-044, Wako chemicals) were charged to a 1 L four neck round bottom flask. Reaction mixture was nitrogen purged at room temperature for 1 h. Inhibitor free butyl acrylate (71.2 g.) was charged to an addition funnel and was purged with nitrogen for 30 min. Reaction mixture was heated to 60° C. while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table III.

EXAMPLE XVII

PolyMMA prepared as in Example XIII (200.0 g.) and initiator (0.066 g.) (2,2'-azobis[2-(2-imidazolin-2-yl)propane]dihydrochloride or VA-044, Wako chemicals) were charged to a 1 L four neck round bottom flask. Reaction mixture was nitrogen purged at room temperature for 1 h. Inhibitor free butyl acrylate (71.2 g.) was charged to an addition funnel and was purged with nitrogen for 30 min. Reaction mixture was heated to 60° C. while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table III.

EXAMPLE XVIII

PolyMMA prepared as in Example XIII (200.0 g.) and initiator (0.66 g.) (2,2'-azobis[2-(2-imidazolin-2-yl)propane]dihydrochloride or VA-044, Wako chemicals) were charged to a 1 L four neck round bottom flask. Reaction mixture was nitrogen purged at room temperature for 1 h. Inhibitor free butyl acrylate (71.2 g.) was charged to an addition funnel and was purged with nitrogen for 30 min. Reaction mixture was heated to 60° C. while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table III.

TABLE III

Conversion, Particle size and Molecular weight data for examples

| Example | Overall Conversion % | % Solids | Particle Size (nm) | Molecular weight (Mn) |
|---|---|---|---|---|
| | | Stage I | | |
| XIII | 82.95 | 9.96 | | |
| XIV | 96.59 | 17.55 | 49.8 | 25,938 |
| | | Stage II | | |
| XIII | 81.79 | 33.09 | | |
| XV | 72.81 | 28.54 | 76.0 | 49,749 |
| XVI | 98.21 | 38.50 | 80.3 | 49,652 |
| XVII | >99.9 | 40.22 | 112.4 | 39,798 |
| XVIII | >99.9 | >39 | 116.9 | NA |

Polystyrene emulsion (51.35% Solids) was used as a first stage for examples XIX to XXIV. Care was taken to exhaust any residual initiator and trapped radicals in this emulsion before stage II polymerization. Example XXII is a control experiment without any additional initiator, and with no trapped radicals.

EXAMPLE XIX

Polystyrene (101.0 g.), water (15.0 g.), and initiator (0.025 g.) (2,2"-Azobis (N,N'-amidinopropane) dihydrochloride or V-50, Wako chemicals) were charged to a one liter four neck round bottom flask. Reaction mixture was nitrogen purged at room temperature for 1 h. Inhibitor free butyl acrylate (50.0 g.) was charged to an addition funnel and was purged with nitrogen for 30 min. Reaction mixture was heated to 60° C. while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table IV.

EXAMPLE XX

Polystyrene (101.0 g.), water (15.0 g.), and initiator (0.05 g.) (2,2"-Azobis(N,N'-amidinopropane)dihydrochloride or V-50, Wako chemicals) were charged to a one liter four neck round bottom flask. Reaction mixture was nitrogen purged at room temperature for 1 h. Inhibitor free butyl acrylate (50.0 g.) was charged to an addition funnel and was purged with nitrogen for 30 min. Reaction mixture was heated to 60° C. while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table IV.

EXAMPLE XXI

Polystyrene 50× (101.0 g.), water (15.0 g.), and initiator (0.1 g.) (2,2″-Azobis(N,N'-amidinopropane)dihydrochloride or V-50, Wako chemicals) were charged to a one liter four neck round bottom flask. Reaction mixture was nitrogen purged at room temperature for 1 h. Inhibitor free butyl acrylate (50.0 g.) was charged to an addition funnel and was purged with nitrogen for 30 min. Reaction mixture was heated to 60° C. while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table IV.

EXAMPLE XXII

Polystyrene (50.0 g.) and water (121.2 g.) (in the absence of initiator) were charged to a one liter four neck round bottom flask. Reaction mixture was nitrogen purged at room temperature for 1 h. Inhibitor free butyl acrylate (70.0 g.) was charged to an addition funnel and was purged with nitrogen for 30 min. Reaction mixture was heated to 60° C. while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table IV.

EXAMPLE XXIII

Polystyrene (50.0 g.), water (125.2 g.), and initiator (0.025 g.) (2,2″-Azobis(N,N'-amidinopropane)dihydrochloride or V-50, Wako chemicals) were charged to a one liter four neck round bottom flask. Reaction mixture was nitrogen purged at room temperature for 1 h. Inhibitor free butyl acrylate (70.0 g.) was charged to an addition funnel and was purged with nitrogen for 30 min. Reaction mixture was heated to 60° C. while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table IV.

EXAMPLE XXIV

Polystyrene (50.0 g.), water (125.2 g.), and initiator (0.05 g.) (2,2″-Azobis(N,N'-amidinopropane)dihydrochloride or V-50, Wako chemicals) were charged to a one liter four neck round bottom flask. Reaction mixture was nitrogen purged at room temperature for 1 h. Inhibitor free butyl acrylate (70.0 g.) was charged to an addition funnel and was purged with nitrogen for 30 min. Reaction mixture was heated to 60° C. while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table IV.

TABLE IV

Conversion, Particle size and Molecular weight data for examples

|  | XIX | XX | XXI | XXII | XXIII | XXIV |
|---|---|---|---|---|---|---|
| Polystyrene emulsion (51.35% Solids) (g.) | 101.0 | 101.0 | 101.0 | 50.0 | 50.0 | 50.0 |
| Water (g.) | 15.0 | 15.0 | 15.0 | 121.2 | 125.2 | 125.2 |
| V-50 (g.) | 0.025 | 0.05 | 0.1 | — | 0.025 | 0.05 |
| BA (g.) | 50.0 | 50.0 | 50.0 | 70.0 | 70.0 | 70.0 |
| Temp. (° C.) | 60 | 60 | 60 | 60 | 60 | 60 |
| BA slow add over h | 2 | 2 | 2 | 2 | 2 | 2 |
| Theo. % Solids stage-I | 44.72 | 44.73 | 44.76 | 15.0 | 14.67 | 14.68 |
| Theo. % Solids stage-II | 45.03 | 45.03 | 45.03 | 39.67 | 39.03 | 39.03 |
| Final % Solids | 36.36 | 40.02 | 30.32 | 13.52 | 29.03 | 34.53 |
| Final % Conversion | 80.74 | 88.87 | 67.33 | — | 74.38 | 88.47 |
| Mn | 48,633 | 59,690 | 78,769 | 50,059 | 92,238 | 71,489 | while stirring. Inhibitor free butyl acrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically and molecular weight was determined using size exclusion chromatography on a water system using waters styragel columns and polystyrene standards. The conversion, particle size, and molecular weight data is given in Table IV.

EXAMPLE XXV

A master batch of first stage polymerization of vinyl acetate was prepared as a stage I. Small amount of prepared polyEHA was used to carry out reactions with 2-ethyl hexylacrylate in the presence of different levels of initiator as stage II experiments. Water (802.8 mL), surfactant (Igepal CA-897 Octylphenol ethoxylate, Rhodia) (9.93 g.), and initiator (0.804 g.) (2,2'-azobis[2-(2-imidazolin-2-yl)propane]dihydrochloride or VA-044, Wako chemicals) in a 2 L four neck round bottom flask were purged with nitrogen for 45 min. Vinyl acetate monomer (81.91 g.) in a slow add funnel was purged with subsurface nitrogen for 30 min. Reaction mixture was heated to 65° C. while stirring over 20 min. At room temperature monomer addition was started. From room temperature to 65° C., over 25 min. (15 mL) of vinyl acetate monomer was slow added. Remaining monomer was slow added over 1.5 hours. Reaction mixture was held at 65° C. for 30 min. Reaction mixture was cooled to room temperature and analyzed for % Solids and PS. The conversion and particle size data is given in Table V.

After several weeks of storage, the emulsion was heated in an oven to 65° C. for 22 hours to ensure that all the initiator had been consumed. The emulsion was divided into four parts that were used to conduct four Stage II experiments with varying levels of initiator added to the Stage I emulsion along with the Stage II monomer, EHA.

EXAMPLE XXVI

PolyVAc prepared as XXV (152.97 g.) and initiator (0.1006 g.) (2,2'-azobis[2-(2-imidazolin-2-yl)propane]dihydrochloride or VA-044, Wako chemicals) were charged to a 1 L four neck round bottom flask. Reaction mixture was nitrogen purged at room temperature for 1 h. Inhibitor free 2-ethyl hexylacrylate (15.43 g.) was charged to an addition funnel and was purged with nitrogen for 30 min. Reaction mixture was heated to 60° C. while stirring. Inhibitor free 2-ethyl hexylacrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically. The conversion and particle size data is given in Table V.

EXAMPLE XXVII

PolyVAc prepared as XXV (152.23 g.) and initiator (0.0112 g.) (2,2'-azobis[2-(2-imidazolin-2-yl)propane]dihydrochloride or VA-044, Wako chemicals) were charged to a 1 L four neck round bottom flask. Reaction mixture was nitrogen purged at room temperature for 1 h. Inhibitor free 2-ethyl hexylacrylate (15.26 g.) was charged to an addition funnel and was purged with nitrogen for 30 min. Reaction mixture was heated to 60° C. while stirring. Inhibitor free 2-ethyl hexylacrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically. The conversion and particle size data is given in Table V.

EXAMPLE XXVIII

PolyVAc prepared as XXV (153.33 g.) and initiator (0.0012 g.) (2,2'-azobis[2-(2-imidazolin-2-yl)propane]dihydrochloride or VA-044, Wako chemicals) in water (3.301 g.) were charged to a 1 L four neck round bottom flask. Reaction mixture was nitrogen purged at room temperature for 1 h. Inhibitor free 2-ethyl hexylacrylate (16.32 g.) was charged to an addition funnel and was purged with nitrogen for 30 min. Reaction mixture was heated to 60° C. while stirring. Inhibitor free 2-ethyl hexylacrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically. The conversion and particle size data is given in Table V.

EXAMPLE XXIX

PolyVAc prepared as XXV (151.17 g.) and initiator (0.00017 g.) (2,2'-azobis[2-(2-imidazolin-2-yl)propane]dihydrochloride or VA-044, Wako chemicals) in water (3.301 g.) were charged to a 1 L four neck round bottom flask. Reaction mixture was nitrogen purged at room temperature for 1 h. Inhibitor free 2-ethyl hexylacrylate (16.90 g.) was charged to an addition funnel and was purged with nitrogen for 30 min. Reaction mixture was heated to 60° C. while stirring. Inhibitor free 2-ethyl hexylacrylate was slow added over 2 hours at 60° C. Reaction mixture was stirred for 2 hours at 60° C. and then was cooled to room temperature. Samples were taken to determine conversion, particle size, and molecular weight. Conversion was determined gravimetrically. The conversion and particle size data is given in Table V.

TABLE V

Conversion, Particle size and Molecular weight data for examples

| Example | Composition | % solids | Particle size (nm) | % conversion |
|---|---|---|---|---|
| | | Stage I | | |
| XXV | Poly(vinyl acetate) | 4.76 | 55.8 | 44.60 |
| | | Stage II | | |
| XXVI | Poly(vinyl acetate/EHA) | 13.53 | 82.2 | 80.55 |
| XXVII | Poly(vinyl acetate/EHA) | 15.14 | 91.2 | 91.14 |
| XXVIII | Poly(vinyl acetate/EHA) | 14.03 | 84.6 | 85.47 |
| XXIX | Poly(vinyl acetate/EHA) | 14.57 | 103.3 | 88.83 |

We claim:

1. A process for producing a polymer having a controlled architecture in a reactor comprising:
    a) forming a first stage stable polymer dispersion by polymerizing one or more monomers in a dispersion medium under monomer-starved conditions using a source of free radicals to initiate polymerization and optionally using a surfactant, stabilizer, or dispersant to stabilize the polymer dispersion and without using a chemical polymerization control agent or capping agent wherein said particles contain an average of at least one living radical per particle; and
    b) adding additional monomer to the first stage dispersion in one or more stages to extend the pre-existing polymer chains by reaction of the additional monomer with the living radicals; and
    c) optionally adding one or more initiators comprising initiator molecules in one or more steps to the dispersion.

2. The process of claim 1, wherein the initiator is added during step (a).

3. The process of claim 1, wherein the initiator is added during step (b).

4. The process of claim 1, wherein the initiator is added during steps (a) and (b).

5. The process of claim 1, wherein the number of initiator molecules are in the range of 0.001 to 10,000 times the number of polymer particles present in the reactor.

6. The process of claim 5, wherein the number of initiator molecules are in the range of 0.01 to 1000 times the number of polymer particles present in the reactor.

7. The process of claim 6, wherein the number of initiator molecules are in the range of 0.1 to 1000 times the number of polymer particles present in the reactor.

8. The process of claim 1 wherein said dispersing medium is water.

9. The process of claim 1 wherein said first stage dispersion is formed by regulating said particle size, monomer and/or solvent concentration within said particle.

10. The process of claim 1 wherein said source of free radical generating agent is a water-soluble initiator.

11. The process of claim 1 further comprising adding, following step (b) and optionally step (c), at least one additional monomer in at least one additional stage to the said dispersion polymer having living, trapped radicals.

12. The process of claim 1 wherein the additional monomer in step (b) and/or subsequent stages comprises the same monomer as in the first stage polymerization.

13. The process of claim 1 wherein the additional monomer in step (b) or in any subsequent stages comprises at least one monomer which is different than the first stage monomer, resulting in a block copolymer.

14. The process of claim 1 wherein the additional monomer in step (b) or in any subsequent stages comprises at least one monomer which is different than the first stage monomer, resulting in a graft copolymer.

15. The process of claim 1 wherein the additional monomer in step (b) or in any subsequent stages comprises at least one monomer which is different than the first stage monomer, resulting in a mixture of block and graft copolymers.

16. The process of claim 1 wherein said copolymer is highly branched or hyperbranched.

17. The process of claim 1 wherein said dispersion medium is an admixture of two or more liquids.

18. The process of claim 1 wherein said stabilizer is a colloid.

19. The process of claim 1 wherein said surfactant is a non-ionic surfactant.

20. The process of claim 13 wherein said block copolymer is a pure block copolymer.

21. The process of claim 13 wherein said block copolymer is a tapered block copolymer.

22. The process of claim 1 wherein said first stage monomer and said second stage monomer comprise at least one hydrophobic monomer and at least one hydrophilic monomer.

* * * * *